(12) United States Patent
Tanaka et al.

(10) Patent No.: US 8,813,907 B2
(45) Date of Patent: Aug. 26, 2014

(54) NOISE REDUCTION SYSTEM WITH CHAMBER

(75) Inventors: Nozomi Tanaka, Tokyo (JP); Shinya Kusuda, Tokyo (JP); Tsutomu Oishi, Tokyo (JP); Yoshinori Oba, Tokyo (JP)

(73) Assignee: IHI Corporation (JP)

( * ) Notice: Subject to any disclaimer, the term of this patent is extended or adjusted under 35 U.S.C. 154(b) by 0 days.

(21) Appl. No.: 13/504,200

(22) PCT Filed: Oct. 27, 2010

(86) PCT No.: PCT/JP2010/069079
§ 371 (c)(1),
(2), (4) Date: May 31, 2012

(87) PCT Pub. No.: WO2011/052642
PCT Pub. Date: May 5, 2011

(65) Prior Publication Data
US 2012/0228054 A1 Sep. 13, 2012

(30) Foreign Application Priority Data

Oct. 28, 2009 (JP) ................................. 2009-247780

(51) Int. Cl.
| | | |
|---|---|---|
| *F01N 13/10* | (2010.01) | |
| *F01N 1/14* | (2006.01) | |
| *F02K 1/00* | (2006.01) | |
| *F02K 1/82* | (2006.01) | |
| *F02K 3/02* | (2006.01) | |
| *B63H 11/00* | (2006.01) | |
| *F02K 1/34* | (2006.01) | |
| *F02K 1/38* | (2006.01) | |
| *F02K 1/44* | (2006.01) | |
| *F02K 1/46* | (2006.01) | |
| *F02K 1/52* | (2006.01) | |

(52) U.S. Cl.
CPC ..... *F02K 1/34* (2013.01); *F02K 1/38* (2013.01); *F02K 1/44* (2013.01); *F02K 1/46* (2013.01); *F02K 1/52* (2013.01); *F05D 2260/96* (2013.01)

USPC ............ 181/240; 181/213; 181/220; 60/204; 60/226.1; 60/770

(58) Field of Classification Search
CPC ............. F01N 13/10; F02K 1/34; F02K 1/38; F02K 1/44; F02K 1/46; F02K 1/52; F05D 2260/96
USPC .......... 181/240, 220, 213; 60/204, 770, 226.1
See application file for complete search history.

(56) References Cited

U.S. PATENT DOCUMENTS 2,990,905 A * 7/1961 Lilley ........................... 181/220
6,457,654 B1 * 10/2002 Glezer et al. ..................... 239/4

(Continued)

FOREIGN PATENT DOCUMENTS

EP 2256327 A1 * 12/2010 ................ F02K 3/06
GB 1141784 1/1969

(Continued)

OTHER PUBLICATIONS

International Search Report and Written Opinion mailed Jan. 25, 2011 in corresponding PCT International Application No. PCT/JP2010/069079.

(Continued)

*Primary Examiner* — David Warren
*Assistant Examiner* — Christina Russell
(74) *Attorney, Agent, or Firm* — Ostrolenk Faber LLP (57) ABSTRACT

A noise reduction system with a chamber includes a chamber (17) which is provided at a portion of a supply path connecting a flow path in an upstream side of a combustor in a jet engine to a plurality of microjet nozzles which is provided at an exhaust side peripheral edge of a main nozzle of the jet engine, wherein the supply path is configured to supply part of compressed air from the flow path into the chamber (17), and the chamber (17) is configured to inject the compressed air through the plurality of the microjet nozzles (63) to a jet flow.

3 Claims, 6 Drawing Sheets

(56) References Cited

U.S. PATENT DOCUMENTS

| | | | |
|---|---|---|---|
| 7,159,383 B2* | 1/2007 | Barton et al. | 60/226.1 |
| 7,246,481 B2* | 7/2007 | Gutmark et al. | 60/204 |
| 7,293,401 B2* | 11/2007 | Papamoschou | 60/226.1 |
| 7,735,601 B1* | 6/2010 | Stieger et al. | 181/213 |
| 7,966,826 B2* | 6/2011 | Alkislar et al. | 60/770 |
| 2004/0088967 A1* | 5/2004 | Webster et al. | 60/204 |
| 2005/0210860 A1* | 9/2005 | Gutmark et al. | 60/204 |
| 2007/0227119 A1* | 10/2007 | Alkabie | 60/249 |
| 2011/0000181 A1* | 1/2011 | Oishi et al. | 60/39.5 |
| 2012/0240587 A1* | 9/2012 | Tanaka et al. | 60/770 |

FOREIGN PATENT DOCUMENTS

| | | |
|---|---|---|
| JP | 47-23605 | 7/1972 |
| JP | 2005-195019 | 7/2005 |
| JP | 2010-518323 | 5/2010 |
| JP | 2011099420 A * | 5/2011 |
| JP | 2011112001 A * | 6/2011 |
| WO | WO 2008/100712 | 8/2008 |

OTHER PUBLICATIONS

B. Greska et al., "The Effects of Microjet Injection on an F404 Jet Engine," AIAA 2005-3047, 11th AIAA/CEAS Aeroacoustics Conference (26th AIAA Aeroacoustics Conference), May 23-25, 2005, 23 pages.

Cheng Le, et al., "Improved Intake/Exhaust Mufflers of Gas Turbine and Discussion of Design Thereof", *Gas Turbine Technology*, vol. 13, No. 3 (Sep. 30, 2000) pp. 23-26. Partial Translation.

Chinese Office Action, dated Apr. 28, 2014 issued in corresponding Chinese Patent Application No. 201080048438.7. English translation. Total 14 pages.

* cited by examiner

NOISE REDUCTION SYSTEM WITH CHAMBER

CROSS-REFERENCE TO RELATED APPLICATIONS

The present application is a 35 U.S.C. §§371 national phase conversion of PCT/JP2010/069079, filed Oct. 27, 2010, which claims priority of Japanese Patent Application No. 2009-247780, filed Oct. 28, 2009, the contents of which are incorporated herein by reference. The PCT International Application was published in the Japanese language.

TECHNICAL FIELD

The present invention relates to a noise reduction system used for a jet engine of an aircraft.

TECHNICAL BACKGROUND

A jet engine of an aircraft includes a fan to take air therein, a compressor to take in and compress part of the air taken by the fan, a combustor to mix compressed air generated by the compressor with fuel and to combust the mixture, and a turbine to drive the fan and the compressor by using combustion gas from the combustor, which are all arranged in sequence.

The compressor, combustor and turbine are installed in a main nozzle as a cylindrical partition, and the fan is placed in the upstream side of the main nozzle. Most of the air taken by the fan flows through a bypass flow path which is provided between the main nozzle and a casing (an engine nacelle) covering the outer periphery of the main nozzle. The air (a bypass flow) which has flowed through the bypass flow path is exhausted so as to surround the outside of a core flow (a jet flow) of the turbine, and thus joins to the jet flow.

The area where the jet flow and the bypass flow join to each other becomes a noise source, and thus noise occurs. Various arts are disclosed to reduce such noise.

For example, an art is disclosed in which a microjet nozzle is provided at an exhaust side peripheral edge of the main nozzle, and a microjet is injected from the microjet nozzle to the confluence of the jet flow and the bypass flow (e.g., refer to Non-Patent Document 1).

The microjet nozzle communicates with a fan section or the compressor in the jet engine via pipes which are installed in the periphery of the main nozzle. Part of the compressed air generated by the fan or the compressor is guided through the pipes to the microjet nozzle, and then the compressed air is microjet-injected from the microjet nozzle. By this configuration, the microjet properly mixes the jet flow and the bypass flow, and the noise can be reduced.

In Patent Document 1, a system and a method are disclosed to reduce exhaust noise of a jet engine nozzle having projections (Chevron). The method disclosed in Patent Document 1 includes the steps of generating a first flow of gas by a jet engine, delivering the first flow through a nozzle having a trailing edge perimeter that includes multiple projections extending in the aft direction, and injecting a second flow of a pressurized fluid into the first flow proximate to the projections.

In Patent Document 2, a device is disclosed to reduce exhaust noise of a jet engine by using an oscillating jet.

DOCUMENTS OF THE CONVENTIONAL ART

Patent Documents

[Patent Document 1] Published Japanese Translation No. 2010-518323 of the PCT International Publication

[Patent Document 2] Japanese Patent Application, First Publication No. 2005-195019

Non-Patent Documents

[Non-Patent Document 1] Brenton Greska, other four people, The Effects of Microjet Injection On an F404 Jet Engine, AIAA2005-3047, 11th AIAA/CEAS Aeroacoustics Conference (26th AIAA Aeroacoustics Conference), 23-25 May 2005

DISCLOSURE OF THE INVENTION

Problems to be Solved by the Invention

However, in the above conventional arts, because the compressed air is guided from the fan section or the compressor to the microjet nozzle through the pipes, it is difficult to perform the microjet-injection due to a pressure loss in each of the pipes. For example, in the above Patent Document 1, a pressure loss occurs because a velocity difference is caused by a Chevron Nozzle, and thereby it is difficult to perform the microjet-injection efficiently.

In addition, there is a possibility that the pipe guiding the compressed air expands by heat of the jet engine, the pipe is damaged, and the injection position thereof is displaced.

Further, fluid noise occurs in response to a cavity flow around the pipe, or additional noise occurs in connection with vibration of the pipe.

Operations to install the pipes are complicated, and man-hours for assembling are increased.

Moreover, there is also a possibility that a proper noise reduction effect of the microjet is not obtained by dispersion of accuracy when the pipes are installed.

In Patent Document 2, a channel which guides an oscillating flow so as to flow out toward engine exhaust gas is configured as a thin pipe. Accordingly, a pressure loss in the thin channel becomes large, and it is practically difficult to supply sufficient oscillating flow to effectively reduce engine exhaust noise. In addition, additional devices, a flow control valve, a flow stabilizer and the like, have to be attached to the channel which guides the oscillating flow. Accordingly, the number of components which compose a system increases, the structure of the system becomes complicated, and assembling workability deteriorates.

The present invention was conceived in view of the above-described circumstances, and provides a noise reduction system that can efficiently inject a microjet, avoid damage of a pipe, and prevent displacement of a placement position thereof.

In addition, the invention provides a noise reduction system that makes it possible to prevent additional noise in connection with vibration of a pipe, and to improve assembling workability.

Means for Solving the Problem

A noise reduction system with a chamber of the first aspect of the present invention is characterized by including a chamber which is provided at a portion of a supply path connecting a flow path in an upstream side of a combustor in a jet engine to a plurality of microjet nozzles which is provided at an exhaust side peripheral edge of a main nozzle of the jet engine, wherein the supply path is configured to supply part of compressed air in the flow path into the chamber, and the chamber is configured to inject the compressed air through the plurality of the microjet nozzles to a jet flow exhausted from the main nozzle.

By configuring like this, a space from the flow path in the upstream side of the combustor to the microjet nozzle can be set large. Accordingly, the pressure loss by using a conventional pipe can be reduced, the microjet can be injected uniformly in the circumferential direction thereof by uniformly pressurizing the chamber, and it is possible to efficiently reduce noise.

In addition, because the chamber is installed instead of the pipe, in response to removal of the pipe, damage to the pipe by heat of the jet engine can be avoided, and the displacement of the placement position thereof can be prevented.

Further, because the structure of the chamber is simple, the chamber can be more easily installed than installing operations of the pipe. Therefore, assembling workability thereof can be improved.

A noise reduction system with a chamber of the second aspect of the present invention is characterized in that the chamber is provided on an outer peripheral surface of the main nozzle in the vicinity of the microjet nozzles.

By configuring like this, the exposure of the pipe can be reduced at the outer peripheral surface of the main nozzle. Accordingly, a cavity flow can be suppressed in response to removal of the pipe, and additional noise in connection with vibration of the pipe can be avoided. The nacelle resistance can be reduced, and thereby it is possible to improve the aerodynamic performance of the jet engine.

In addition, the distance from the chamber to the tip of the microjet nozzle can be set short, and thereby the pressure loss of the compressed air can be more reliably reduced in response to shortening of the distance. Therefore, it is possible to more efficiently inject the microjet.

A noise reduction system with a chamber of the third aspect of the present invention is characterized in that the chamber includes: an inner peripheral wall which is configured as a portion of an inner periphery of the main nozzle; and an outer peripheral wall which is configured as a portion of an outer periphery of the main nozzle, and is formed so as to cover the inner peripheral wall, and the inner and outer peripheral walls are configured so that the compressed air is taken in a space formed between the inner and outer peripheral walls.

By configuring like this, the outer surface of the main nozzle can be smoothly formed, the cavity flow can be more reliably avoided, and the nacelle resistance can be more reliably reduced. Accordingly, the occurrence of additional noise can be more reliably suppressed.

In addition, the structure of the chamber can be further simplified, and an increase in the size of the main nozzle can be avoided. Moreover, the assembling workability thereof can be further improved.

Effects of the Invention

According to the present invention, a space from the flow path in the upstream side of the combustor to the microjet nozzle can be set large. Accordingly, the pressure loss by using a conventional pipe can be reduced, the microjet can be injected uniformly in the circumferential direction by uniformly pressurizing the chamber, and it is possible for noise to be efficiently reduced.

In addition, because the chamber is installed instead of the pipe, in response to removal of the pipe, damage to the pipe by heat of the jet engine can be avoided, and the displacement of the placement position thereof can be prevented.

Further, because the structure of the chamber is simple, the chamber can be more easily installed than installing operations of the pipe. Therefore, the assembling workability thereof can be improved.

In addition, the exposure of the pipe can be reduced at the outer peripheral surface of the main nozzle. Accordingly, the cavity flow can be suppressed in response to removal of the pipe, and the additional noise in connection with vibration of the pipe can be avoided. The nacelle resistance can be reduced, and thereby the aerodynamic performance of the jet engine can be improved.

Further, the distance from the chamber to the tip of the microjet nozzle can be set short, and thus the pressure loss of the compressed air can be more reliably reduced in response to shortening of the distance. Therefore, it is possible to inject the microjet more efficiently.

EMBODIMENTS FOR IMPLEMENTING THE INVENTION (A Jet Engine)

An embodiment of the present invention is explained based on FIGS. 1-5 as follows.

Figure 1:
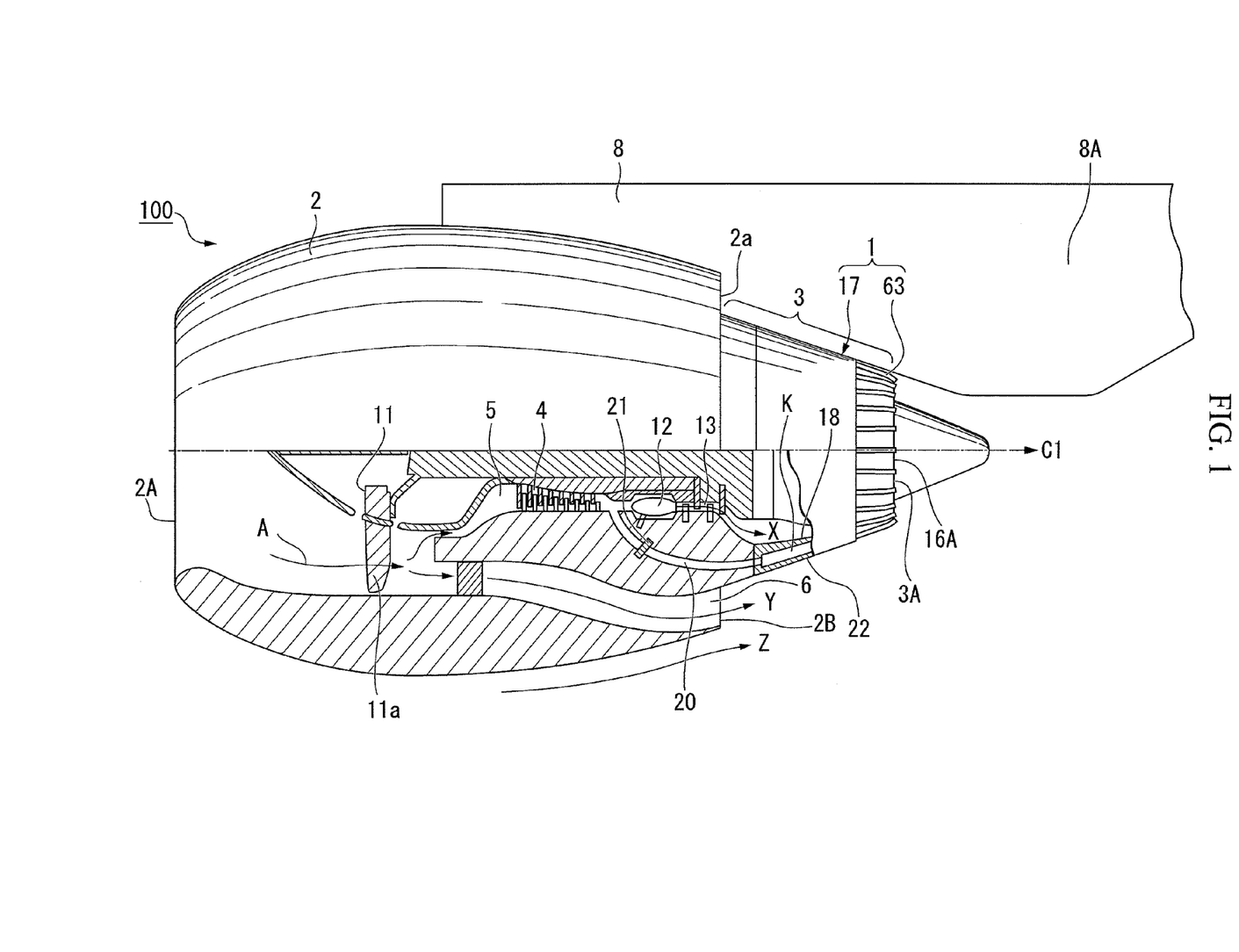
FIG. 1 is a schematic cross-sectional drawing showing the outline structure of a jet engine in an embodiment of the present invention.

FIG. 1 is a schematic cross-sectional drawing showing the outline structure of a jet engine 100 to which a noise reduction system 1 of the present invention is applied.

As shown in FIG. 1, the jet engine 100 includes a cylindrical casing 2, a cylindrical partition 3 which is inserted in the casing 2 so that a portion of the cylindrical partition 3 protrudes from an exhaust side peripheral edge (a trailing edge) 2a of the casing 2, a fan 11a, a compressor 4, a combustor 12, and a turbine 13. The fan 11a, the compressor 4, the combustor 12, and the turbine 13 are arranged inside the casing 2 in sequence from an upstream side to a downstream side along a central axis C1. In addition, the noise reduction system 1 is provided in the exhaust side (the right side in FIG. 1) of the cylindrical partition 3 in the jet engine 100.

The inside of the cylindrical partition 3 is configured as a flow path 5 through which a high velocity jet flow X flows. A space between the cylindrical partition 3 and the casing 2 is configured as a flow path 6 through which a low velocity bypass flow Y flows.

The casing 2 and the cylindrical partition 3 in the jet engine 100 have the functions as an engine nacelle forming the external shape of the jet engine 100. The casing 2 covers a portion of the outer periphery of the cylindrical partition 3.

An opening of the casing 2 in the upstream side functions as an air inlet 2A to take air A therein. On the other hand, an opening of the casing 2 in the downstream side functions as a bypass flow outlet 2B to exhaust the bypass flow Y.

The bypass flow Y is air which was not taken in the compressor 4 among the air A taken in from the air inlet 2A, and is a low velocity fluid which flows between the cylindrical partition 3 and the casing 2. The jet flow X is a fluid which is exhausted from the turbine 13 and flows inside the cylindrical partition 3. The jet flow X is a higher velocity fluid than the bypass flow Y. In the outside of the casing 2, an external air flow Z flows along an outer peripheral surface of the casing 2. In other words, the external air flow Z is a low velocity fluid which flows in the outside of the bypass flow Y.

The cylindrical partition 3 is placed so as to be slightly displaced toward the downstream side relative to the casing 2 along the central axis C1. The cylindrical partition 3 separates the flow path 5 through which the jet flow X flows, from the flow path 6 through which the bypass flow Y flows.

The fan 11a is installed in the vicinity of the upstream side edge inside the casing 2 and in the upstream side of the cylindrical partition 3. The fan 11a takes the air A therein from the outside.

The compressor 4 is installed in the downstream side of the fan 11a inside the cylindrical partition 3. The compressor 4 takes in and compresses part of the air A taken by the fan 11a.

The combustor 12 is installed in the downstream side of the compressor 4 inside the cylindrical partition 3. The combustor 12 mixes fuel into the air A compressed by the compressor 4, combusts the mixture, and exhausts combustion gas.

The turbine 13 is installed in the downstream side of the combustor 12 inside the cylindrical partition 3. The turbine 13 drives the fan 11a and the compressor 4 by using the combustion gas exhausted from the combustor 12.

The casing 2 and the cylindrical partition 3 of the jet engine 100 configured like this are suspended from a wing of an aircraft (not shown), by using a pylon 8 extending toward the downstream side of the jet flow X and the bypass flow Y.

The pylon 8 includes a projecting portion 8A extending toward the downstream side of the casing 2, and the projecting portion 8A extends in the orthogonal direction to the central axis C1 of the casing 2 and the cylindrical partition 3.

The cylindrical partition 3 functions as a main nozzle to exhaust the jet flow X, and the noise reduction system 1 is provided on the outer periphery of the cylindrical partition 3.

(A Noise Reduction System)

Figure 2:
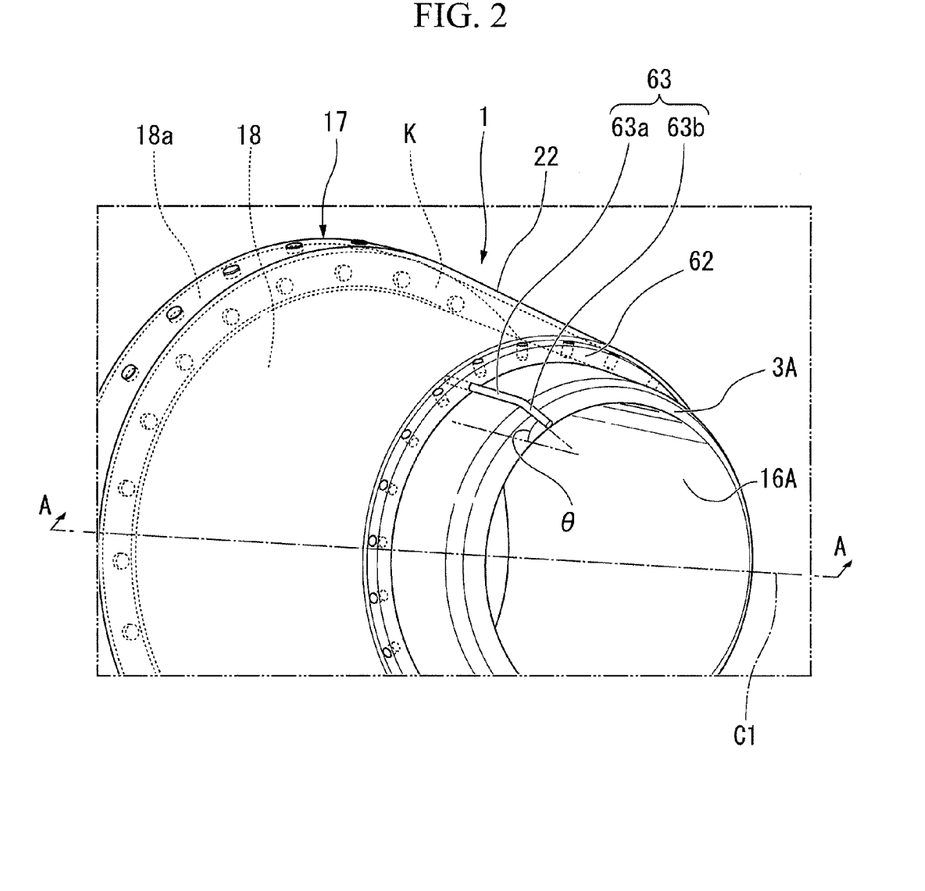
FIG. 2 is a perspective drawing of a noise reduction system in the embodiment of the present invention.
Figure 3:
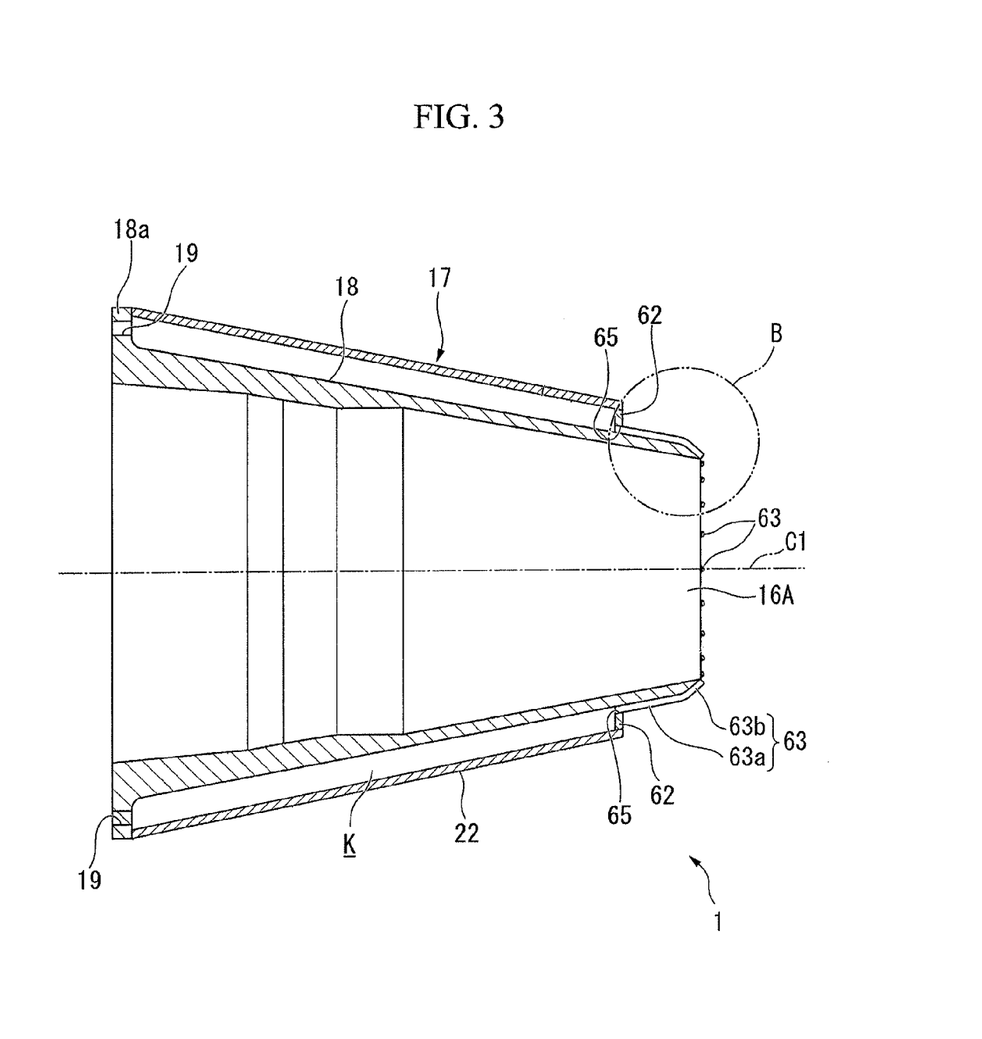
FIG. 3 is a cross-sectional drawing along A-A line of FIG. 2.
Figure 4:
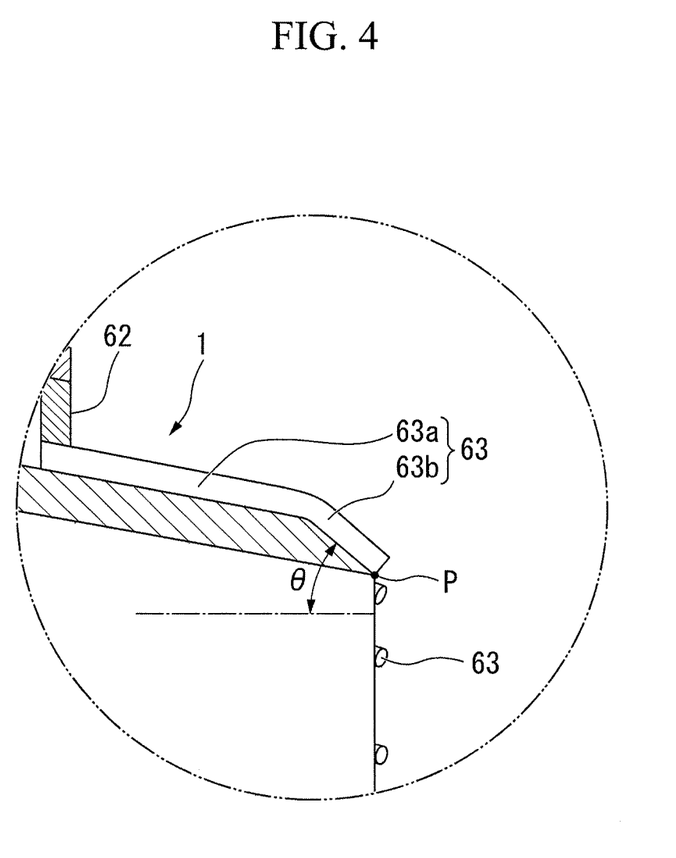
FIG. 4 is an enlarged drawing in B part of FIG. 3.

FIG. 2 is a perspective drawing of the noise reduction system 1. FIG. 3 is a cross-sectional drawing along A-A line of FIG. 2. FIG. 4 is an enlarged drawing in B part of FIG. 3.

As shown in FIGS. 1-4, the noise reduction system 1 includes a chamber 17 which is provided on the outer periphery of the cylindrical partition 3, and a plurality of microjet nozzles 63 which is provided in the downstream side (the right side in FIGS. 1, 2) of the chamber 17 along an exhaust side peripheral edge 3A of the cylindrical partition 3. In addition, because each of the microjet nozzles 63 have the same shape, in FIG. 2, only one of the microjet nozzles 63 is illustrated and the illustration of the other microjet nozzles 63 is omitted.

The chamber 17 is formed of stainless steel (e.g., SUS321), inconel alloy or the like, and includes a cylindrical inner peripheral wall 18 which is configured as a portion of the inner periphery of the cylindrical partition 3.

In other words, the inner peripheral wall 18 is formed in a substantially truncated cone shape when viewed from the side thereof, which is gradually reduced in diameter toward the exhaust side (the downstream side). The inner diameter of the upstream side edge of the inner peripheral wall 18 is the same as the inner diameter of the downstream side edge in the inner peripheral surface of a partition main body of the cylindrical partition 3, the partition main body positioned in the upstream side of the chamber 17.

An outer flange 18a is integrally formed at the upstream side peripheral edge of the inner peripheral wall 18. The outer flange 18a is configured to fix the inner peripheral wall 18 to the partition main body of the cylindrical partition 3, in which a plurality of bolt-holes (not shown) is formed so as to be placed in the circumferential direction thereof at regular intervals. On the other hand, female screws are formed at the partition main body of the cylindrical partition 3 at positions corresponding to the bolt-holes. Bolts (not shown) are threaded into the female screws from the inner peripheral wall 18 side, and thereby the inner peripheral wall 18 can be fastened to the partition main body of the cylindrical partition 3.

A plurality of air inlets 19 is formed at the outer flange 18a at different positions from the bolt-holes (not shown) so as to be placed in the circumferential direction at regular intervals.

The air inlets 19 are connected to the flow path 5 in the upstream side of the combustor 12 via supply paths 20 which are provided in the cylindrical partition 3. One end of the supply path 20 is connected to the air inlet 19 of the outer flange 18a by using a joint (not shown). Accordingly, part of the air A compressed by a fan section 11 or the compressor 4 is taken in the chamber 17. In addition, a valve 21 is provided on a portion of the supply path 20.

Further, for example, a Teflon (a registered trademark) tube or the like is used for the supply path 20.

By using the Teflon (a registered trademark) tube, it is possible to avoid damage to a pipe caused by expansion thereof by heat of the engine, to reduce a pipe friction loss, and to efficiently inject a microjet.

An outer flange 62 is integrally formed at the downstream side peripheral edge of the inner peripheral wall 18. A plurality of through-holes 65 is formed at the outer flange 62 in the circumferential direction at regular intervals, and each of the microjet nozzles 63 is inserted into each of the through-holes 65.

A cylindrical outer peripheral wall 22 is provided in the outside of the inner peripheral wall 18, and is formed so as to cover the inner peripheral wall 18 in the range from the outer flange 18a to the outer flange 62. The outer peripheral wall 22 is formed in a substantially truncated cone shape when viewed from the side thereof, along the extending direction of the inner peripheral wall 18. The outer peripheral wall 22 is configured as a portion of the outer periphery of the cylindrical partition 3. In other words, the outer diameter of the upstream side edge in the outer peripheral surface of the outer peripheral wall 22 is the same as the outer diameter of the downstream side edge in the outer peripheral surface of the partition main body of the cylindrical partition 3 (refer to FIG. 1).

The upstream side peripheral edge of the outer peripheral wall 22 is fixed to the outer flange 18a of the inner peripheral wall 18 by means of welding or the like. The downstream side peripheral edge of the outer peripheral wall 22 is fixed to the outer flange 62 of the inner peripheral wall 18 by means of welding or the like. Part of the air A compressed by the fan 11a or the compressor 4 is taken in a space K that is surrounded by the outer peripheral wall 22 and the inner peripheral wall 18 which are fixed to each other.

The microjet nozzle 63 attached to the outer flange 62 of the inner peripheral wall 18 is formed by piping. The microjet nozzle 63 is formed of a first pipe 63a and a second pipe 63b. The first pipe 63a is extended along the outer peripheral surface of the cylindrical partition 3 and along the axial direction. The second pipe 63b is extended from the end of the first pipe 63a along the exhaust side peripheral edge 3A of the cylindrical partition 3, and is inclined toward the central axis C1.

Sealing properties are secured at the connecting portion between the first pipe 63a and the outer flange 62 of the chamber 17 by means of welding or the like.

The inclination angle θ of the second pipe 63b is set to be 30-45 degrees relative to the central axis C1, and the air A taken in the chamber 17 can be reliably injected to the jet flow X exhausted from a jet flow outlet 16A. The exhaust side peripheral edge 3A of the cylindrical partition 3 is configured so that the second pipe 63b can be disposed at a desired angle, and is formed so as to be gradually reduced in thickness toward the downstream side.

As minutely shown in FIG. 4, the cylindrical partition 3 is gradually reduced in diameter toward the downstream side. The microjet nozzle 63 is provided at the tip of the cylindrical partition 3, that is, so that the end of the second pipe 63b is placed along the exhaust side peripheral edge 3A of the cylindrical partition 3. Therefore, an injection outlet of the microjet nozzle 63 becomes disposed at a throat SP of the cylindrical partition 3.

(Functions)

Functions of the jet engine 100 and the noise reduction system 1 are explained as follows.

As shown in FIG. 1, when an aircraft takes off, at first, the fan 11a is rotated and thereby the air A is taken in from the air inlet 2A. Part of the air A is compressed by the compressor 4, mixed with fuel at the combustor 12, and combusted therein.

In the turbine 13, a driving force is generated to drive the fan 11a and the compressor 4 by using the combustion gas which was exhausted from the combustor 12. Thereafter, the fan 11a is rotated by the driving force generated by the turbine 13, and thereby the air A is taken in.

According to motions like this, the jet flow X flows through the flow path 5 inside the cylindrical partition 3, and is exhausted from the jet flow outlet 16A. In addition, the bypass flow Y flows through the flow path 6 between the cylindrical partition 3 and the casing 2, and is exhausted from the bypass flow outlet 2B. As a result, thrust is obtained and thus the aircraft takes off.

At this time, the valve 21 is opened, and part of the air A which was compressed by the fan 11a or the compressor 4 is taken in the chamber 17. The air A in the chamber 17 is increased to a predetermined pressure, and then the air A is microjet-injected to the jet flow X through the microjet nozzle 63.

Figure 5:
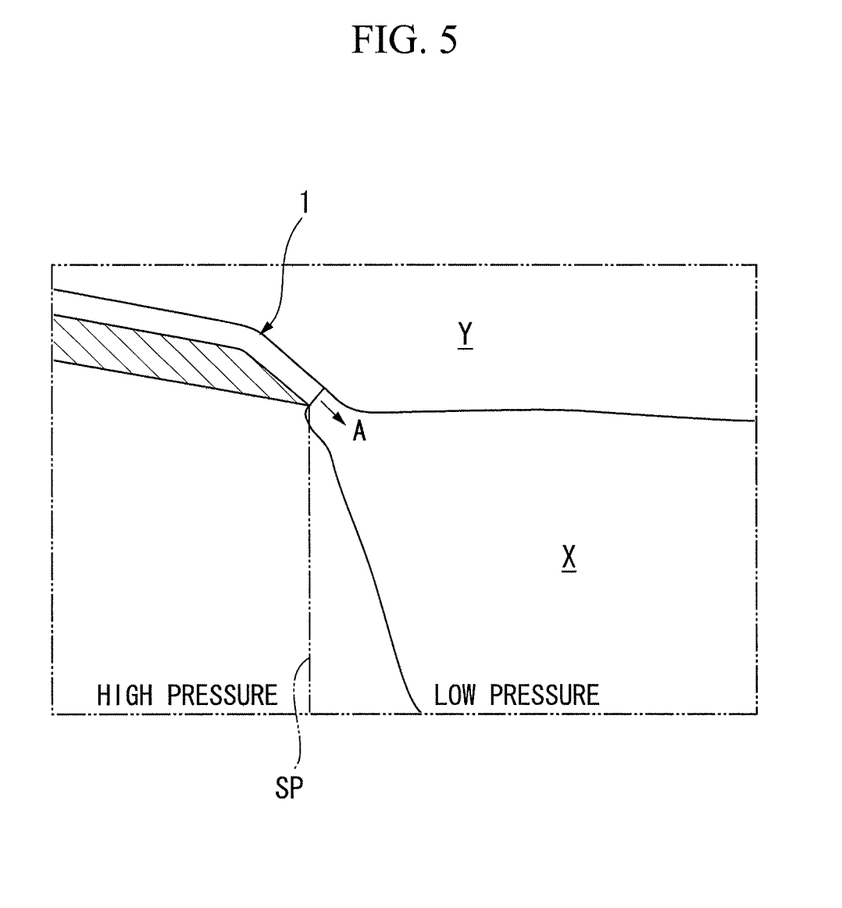
FIG. 5 is an explanatory drawing showing a jet flow and a flow of air in the embodiment of the present invention.

FIG. 5 is an explanatory drawing showing the jet flow X and the flow of the air A when microjet-injection is performed.

In FIG. 5, with respect to the jet flow X, the area in the upstream side of the throat SP has high pressure. On the other hand, the area in the downstream side of the throat SP has lower pressure than the upstream side. Therefore, the microjet-injection is injected to the low pressure area, and thereby a sufficient flow volume can be secured without excessively increasing the pressure in the chamber 17. The microjet-injection is performed from just behind the throat SP toward the downstream side, that is, so that an acute angle is formed between the injection direction from the throat SP and the axial direction.

Because the pressure in the chamber 17 is not excessively increased, the Mach number in the path is not too high, and the pressure loss of the air A in the supply path 20 can be reduced. Further, a path in which a pressure loss occurs can be mostly limited to the microjet nozzle 63.

In addition, because the chamber 17 is disposed adjacent to the upstream side of the microjet nozzle 63, the microjet nozzle 63 can be formed so that the length thereof in the axial direction is as short as possible. Accordingly, the length of the microjet nozzle 63 in which a pressure loss occurs can be set as short as possible, and it is possible to suppress the pressure loss to the minimum.

Figure 6:
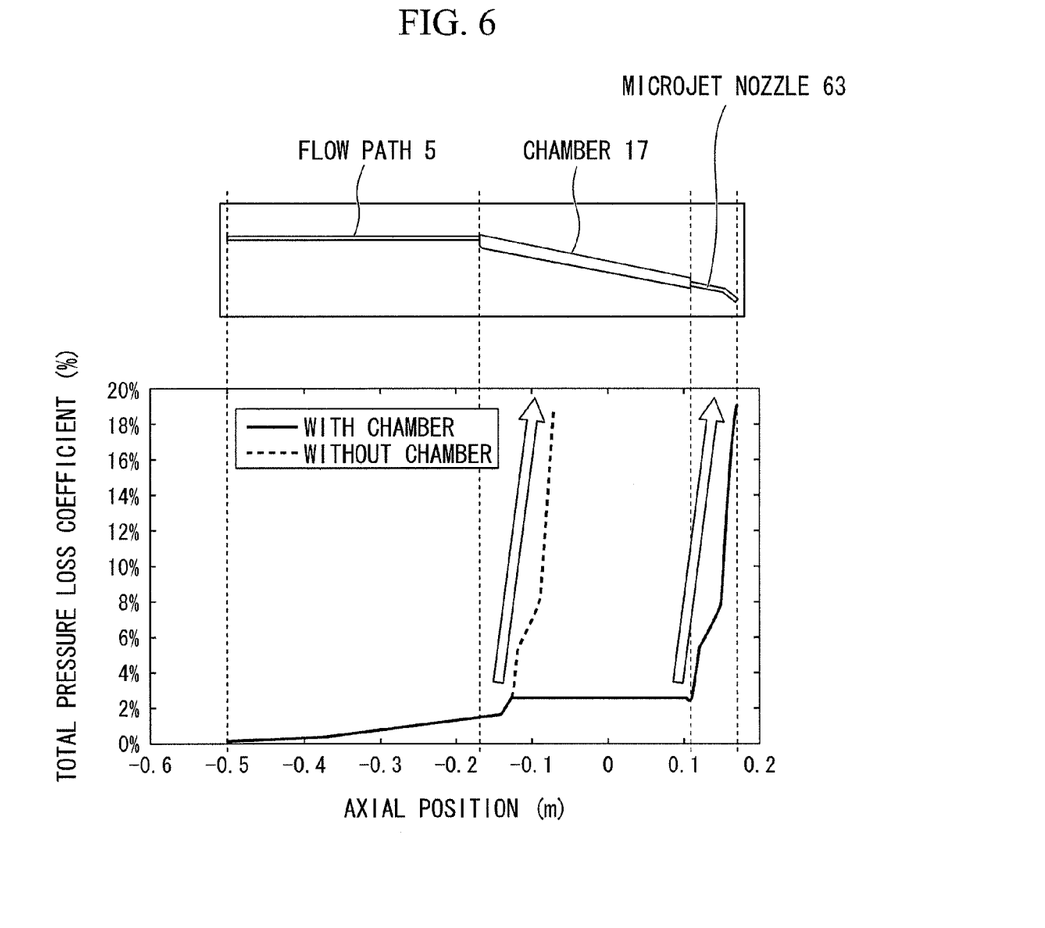
FIG. 6 is a drawing showing a result of verification of a pressure loss reduction effect by a chamber which is provided in the noise reduction system of the present invention.

With respect to the noise reduction system 1 of the embodiment, FIG. 6 shows a result of verification of a pressure loss reduction effect by installing the chamber 17 in the upstream side of the microjet nozzle 63. In the verification result shown in FIG. 6, a part is clipped from the flow path 5 in the upstream side of the combustor 12 through the chamber 17 to the microjet nozzle 63, and the total pressure loss coefficient (%) in the axial position thereof is illustrated. In FIG. 6, the horizontal axis shows the axial position, and the vertical axis shows the total pressure loss coefficient (%).

The verification shown in FIG. 6 in which the following conditions were used was conducted by numerical analysis of the total pressure loss coefficient in each axial position thereof.

The inner diameter of the flow path 5: Φ5 mm, 32 pipes

The area of the microjet outlet: the inner diameter of the injection pipeΦ3.15 (mm)*sqrt (32 pipes/20 inlets)=Φ03.52 mm As shown in FIG. 6, the total pressure loss coefficient sharply increases at the connecting position between the chamber 17 and the microjet nozzle 63, that is, the position where the axial position is 0.1 (m). This is thought to be caused by the increase of the total pressure loss because the microjet nozzle 63 is smaller in cross-section than the chamber 17 having a large cross-section. However, because the microjet nozzle 63 is small in cross-section, even if the total pressure loss sharply increases as shown in FIG. 6, the increase of the total pressure loss at the microjet nozzle 63 is maintained from about 10% to about 20%.

If the chamber 17 is not installed as shown by using a broken line in FIG. 6, the total pressure loss sharply increases from the position where the axial position is 0.18 (m) as the connecting position between the flow path 5 and the chamber 17, in the same manner as the increase of the total pressure loss at the position where the axial position is 0.1 (m) shown in FIG. 6. When the total pressure loss increases from the position where the axial position is 0.18 (m) in the same manner as the position where the axial position is 0.1 (m), it is evident that the total pressure loss at the outlet of the microjet nozzle 63 will be more than 50(%).

As is evident from the result shown in FIG. 6, the chamber 17 is an essential component to practically perform microjet-injection in an engine for an aircraft. The reason for this is because the total pressure loss can be suppressed in response to the chamber cubic content by installing the chamber 17.

In the noise reduction system according to the embodiment, by installing the chamber 17, the loss of an extraction pressure from the engine, the extraction pressure to inject the microjet, is greatly reduced, and thus a large extraction from the compressor is unnecessary.

Further, when the temperature of each part of the jet engine 100 increases by the driving thereof, because the chamber 17 is configured to be the space formed by the inner peripheral wall 18 and the outer peripheral wall 22, unlike conventional pipes, damage to the path can be avoided even if heat expansion thereof occurs. Therefore, microjet-injection can be stably performed.

The air A which was microjet-injected comes to the area where the jet flow X and the bypass flow Y which were exhausted are joined to each other, and thus properly mixes both. Accordingly, the noise generated by the confluence of the jet flow X and the bypass flow Y can be reduced.

(Effects)

According to the above embodiment, the chamber 17 is provided between the microjet nozzle 63 and the compressor 4, the air A compressed by the fan 11a or the compressor 4, that is, the compressed air in the flow path 5 in the upstream side of the combustor 12, is supplied into the chamber 17, and the microjet-injection is performed from the chamber 17 through the microjet nozzle 63. Accordingly, the pressure loss by the pipe which has previously occurred can be reduced. Therefore, the microjet can be efficiently injected.

In addition, the chamber 17 is installed instead of the pipe, and thus a part of pipes used from the fan section 11 or the compressor 4 to the microjet nozzle 63 can be removed. The microjet nozzle 63 or the chamber 17 can suppress the risk of damage thereof due to heat expansion to a lower level than a conventional pipe, and thereby the pressure leak due to pipe damage can be avoided. Moreover, by using the chamber 17, there is no possibility that the path position of the air A is displaced, and thus the microjet-injection can be stably performed.

Further, the chamber 17 is formed by the cylindrical inner peripheral wall 18 which is configured as a portion of the inner periphery of the cylindrical partition 3, and the outer peripheral wall 22 which is formed so as to cover the inner peripheral wall 18. Part of the air A which was compressed by the fan 11a or the compressor 4 is taken in the space K which is surrounded by the inner and outer peripheral walls 18, 22. Accordingly, the structure of the chamber 17 can be simplified, and an increase in size of the cylindrical partition 3 can be avoided.

Moreover, by only fastening the outer flange 18a of the inner peripheral wall 18 to the cylindrical partition 3 by using bolts (not shown), the assembling operations thereof can be finished. Therefore, the assembling workability can be further improved compared with installation operations of conventional pipes.

In addition, because the outer peripheral wall 22 of the chamber 17 becomes configured as the periphery of the cylindrical partition 3, pipes and the like are not exposed to the outside, the cavity flow can be avoided, and additional noise in connection with the cavity flow can be prevented. Further, nacelle resistance of the jet engine 100 can be reduced, and the aerodynamic performance thereof can be improved.

INDUSTRIAL APPLICABILITY

A noise reduction system with a chamber of the present invention can efficiently inject a microjet, avoid damage of a pipe, and prevent displacement of a placement position thereof.

In addition, a noise reduction system with a chamber of the present invention makes it possible to avoid additional noise in connection with vibration of a pipe, and to improve assembling workability.

DESCRIPTION OF THE REFERENCE NUMERALS

1 Noise reduction system
2 Casing
3 Cylindrical partition (main nozzle)
4 Compressor
5 Flow path
12 Combustor
17 Chamber
18 Inner peripheral wall
18a, 62 Outer flange
20 Supply path
22 Outer peripheral wall
63 Microjet nozzle
63a First pipe
63b Second pipe
100 Jet engine
A Air
K Space
X Jet flow

What is claimed is:

1. A noise reduction system for a jet engine, the noise reduction system comprising:
a chamber provided at a portion of a supply path, the supply path starting upstream of a combustor in the jet engine and leading to a plurality of microjet nozzles which is provided at an exhaust side peripheral edge of a main nozzle of the jet engine, wherein
the supply path is configured to supply part of compressed air into the chamber from a flow path positioned upstream of the combustor,
the plurality of microjet nozzles is configured to inject the compressed air, which has been supplied to the chamber, into a jet flow exhausted from the main nozzle, the jet flow being formed of combustion gas exhausted from the combustor,
the chamber includes:
a cylindrical inner peripheral wall being part of the main nozzle, and
a cylindrical outer peripheral wall being part of the main nozzle, the outer peripheral wall being formed so as to cover the inner peripheral wall from an outside thereof in a radial direction of the inner peripheral wall,
the chamber is configured to allow the compressed air to be taken between the inner and outer peripheral walls.

2. The noise reduction system according to claim 1, wherein the chamber is provided in a vicinity of the microjet nozzles.

3. The jet engine comprising the noise reduction system according to claim 1.

* * * * *

UNITED STATES PATENT AND TRADEMARK OFFICE
CERTIFICATE OF CORRECTION

| | | |
|---|---|---|
| PATENT NO. | : 8,813,907 B2 | Page 1 of 1 |
| APPLICATION NO. | : 13/504200 | |
| DATED | : August 26, 2014 | |
| INVENTOR(S) | : Tanaka et al. | |

It is certified that error appears in the above-identified patent and that said Letters Patent is hereby corrected as shown below:

On the Title Page Item [75]

The third inventor, Tsutomu Oishi, residence should read:
    Hanno (JP)

The fourth inventor, Yoshinori Oba, residence should read:
    Tokorozawa (JP)

Signed and Sealed this
Seventeenth Day of February, 2015

Michelle K. Lee
*Deputy Director of the United States Patent and Trademark Office*